April 18, 1961  SHOJI ANZAI  2,980,002
MECHANISM OF IRIS STOP FOR CAMERA
Filed June 10, 1957  4 Sheets-Sheet 1

INVENTOR.

April 18, 1961 SHOJI ANZAI 2,980,002
MECHANISM OF IRIS STOP FOR CAMERA
Filed June 10, 1957 4 Sheets-Sheet 3

INVENTOR.
Shoji Anzai
BY

April 18, 1961 SHOJI ANZAI 2,980,002
MECHANISM OF IRIS STOP FOR CAMERA
Filed June 10, 1957 4 Sheets-Sheet 4

INVENTOR.
Shoji Anzai
BY

United States Patent Office 2,980,002
Patented Apr. 18, 1961

2,980,002

MECHANISM OF IRIS STOP FOR CAMERA

Shoji Anzai, 638 Shimizu-cho, Shimura, Itabashi-ku, Tokyo, Japan

Filed June 10, 1957, Ser. No. 664,521

Claims priority, application Japan June 9, 1956

6 Claims. (Cl. 95—42)

The present invention relates to a mechanism comprising an iris stop for a camera, characterized in that on a camera obscura in a position opposite to a shutter button, a movable iris operating button is provided, by the pushing of which the iris is properly stopped or closed according to the setting of a graduated iris stop indicating ring, a desired stop or degree of closure is then determined and set by hand adjustment of said stop indicating ring. The iris is then opened automatically by releasing said iris operating button. Further by pushing the shutter button the desired iris stop is automatically restored and a picture is taken.

Referring to the drawings.

Figure 6:
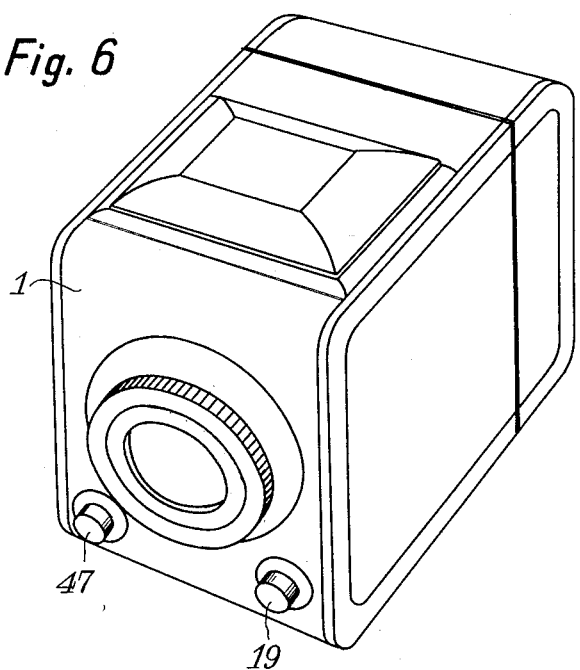
Fig. 6 is a perspective view of a camera body showing the shutter and iris operating buttons.

In the drawing a camera obscura or body 1 is employed in which there is mounted a reflecting mirror 2. There are provided a grooved rail or rails 4 in which slide a mirror supporting rod 3, the latter being provided at the lower extremity of such reflecting mirror 2. A lever arm 5 is provided and is pivotally engaged at one end with one side of the body 1 by means of a pin bolt 6 and is fitted with a spring 7 to cause its other end always to engage with said suporting rod 3 mounting the reflecting mirror 2. A splined shaft 8 is provided having a grooved rail 10 suitable for accommodating the outward and inward motion of a lens cylinder 9. To the shaft 8 there is mounted a sector 11 by means of a key 12, which key is connected to a pin 15 projecting from and mounted on said lever 5, the connection being by means of a strand of wire 13 which passes over a roller 14. A lever arm 16 further is provided on the shaft 8 for the purpose of coacting with the iris mechanism as will be set forth below. A bearing 17 is provided which is fixed to the camera body 1 to support said shaft 8. Said lever arm 16 is supported in a bearing 18 which in turn is mounted upon the cylinder 9. An iris operating button 19 (Fig. 6) is provided and projects from the camera body 1 and is located in a position opposite to that of shutter button 47.

The operative interconection between the iris operating button 19 and the iris is as follows:

A sliding bracket 20 is provided which is connected with the iris operating button 19 by a guide rod 21 and further a connecting bracket 22 is provided and mounted for horizontal sliding movement. The bracket 22 is urged resiliently to the left, as viewed in Fig. 1 by means of a spring 23 which is connected to the righthand extremity thereof and to the pin 25 and thus so urges same to the left against the bracket 20. In order to communicate motion to the lever arm 26 from the bracket 22, a projection 24 is provided which is fixed to such bracket 22. The lever arm 26 has mounted thereon the pin 25 to which the other end of the spring 23 is connected.

The lever arm 26 is operatively connected to the aforementioned sector 11 by means of a strand of wire 28 which is connected to a pin 27 at one end of the lever arm 26. Said projection 24 is always urged to the left, as viewed in Fig. 1, by means of a spring 29.

Figure 2:
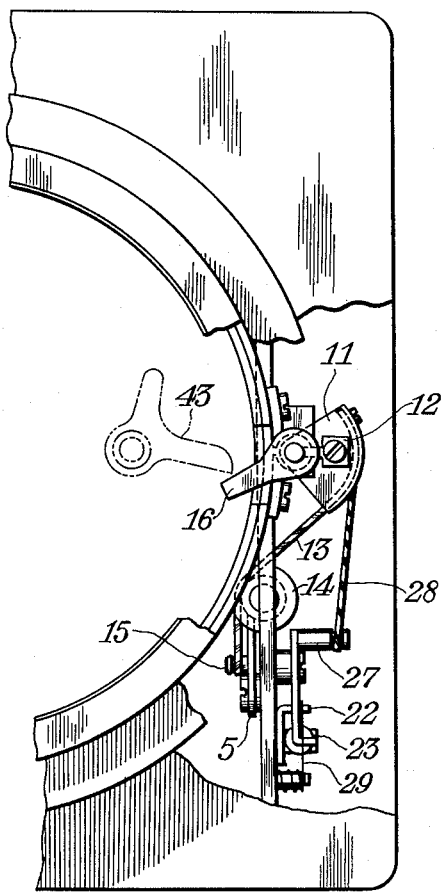
Fig. 2 is a front elevation of portions of the camera shown in Fig. 1.
Figure 3:
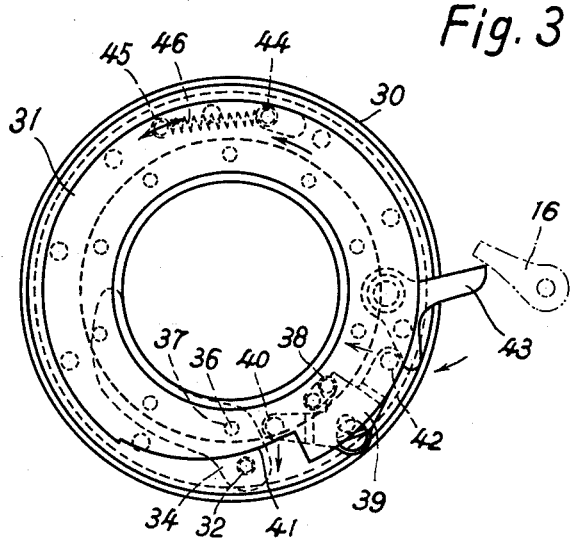
Fig. 3 is a front elevation of an iris assembly employed in the present invention.
Figure 4:
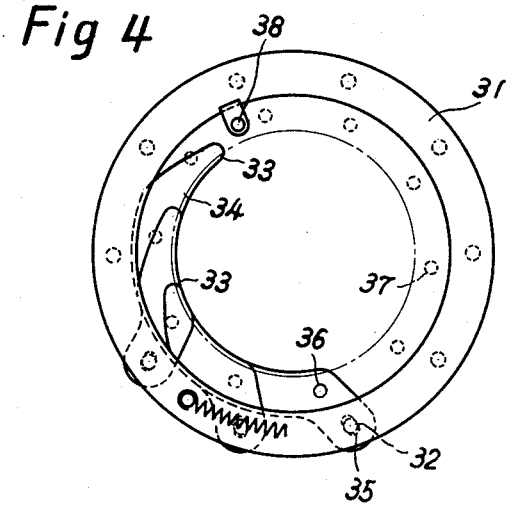
Fig. 4 is a front elevation of portions of iris diaphragms employed in the present invention.
Figure 5:
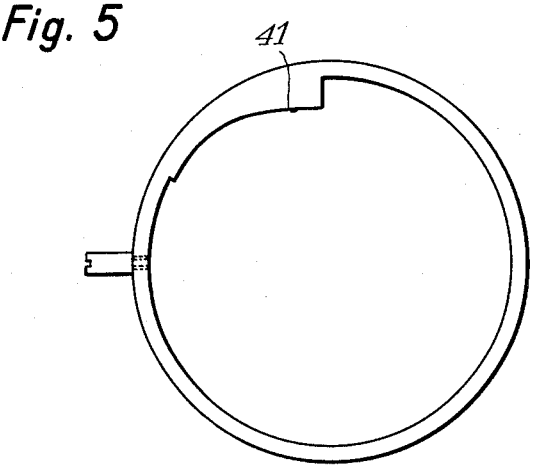
Fig. 5 is a plan view of a cam ring mounted for angular adjustment on a lens supporting ring of Fig. 4.

Referring now to the lens supporting structure of Figs. 2, 3 and 4, a lens supporting ring 30 is provided to which an iris operating ring 31 is slidably fitted. On the border or circumferential area of the operating ring 31 a plurality of pins 32 are mounted spaced at a selected interval and which pins are loosely inserted in holes 35 formed in the base of each iris diaphragm 34 (Fig. 4). Each diaphragm 34 is tapered towards the end thereof and has a curved edge 33 on the end thereof.

From the iris diaphragms 34, the pins 36 extend and engage holes 37 correspondingly provided on the reverse surface of the lens supporting ring 30. The diaphragms are pivotally supported by the pins 36 respectively. In order to operatively interconnect the iris operating ring 31 and the reverse surface of the lens supporting ring, a pin 38 is provided which is mounted on one side of the border of the iris operating ring 31. Such operative interconnection is accomplished by an angle-shaped lever arm 39 pivotally mounted on the lens supporting ring 30 so as to contact with said pin 38. The center part of the lever arm 39 is pivotally mounted upon said ring 30.

For the purpose of restricting or adjusting the extent of angular movement of the iris operating lever arm 39, there are provided the following means:

A pin 40 mounted on one end of the lever arm 39 which coacts with an angularly shiftable cam 41. The cam 41 is movably mounted on the outer circumference of the lens supporting ring 30 so as to be contactable by the pin 40 when the iris operating lever arm 39 is angularly shifted counterclockwise (Fig. 3). Further on the other end of the iris operating lever arm 39 a pin 42 is provided for the purpose of coacting with another lever arm 43 also mounted for pivotal movement on the lens supporting ring 30.

In order to urge continuously the iris diaphragms toward an open position, resilient means are provided comprising a spring 46 (Fig. 3) which is connected at its opposite ends to pins 44 and 45 which respectively are mounted upon the iris operating ring 31 and the fixed supporting ring 30.

To permit the aforementioned lever 16 (which shifts angularly with the sector 12) to actuate the diaphragm (iris) control means thereby to restrict the closure of the diaphragm, one end of the aforementioned lever arm 43 extends beyond the outer circumference of the lens supporting ring 30.

The operation of the above-described embodiment of the present invention is as follows:

By angular shifting of a graduated iris stop indicating ring (not shown) to a desired stop or graduation as shown on such stop indicating ring, the extent of angular motion or swing of the iris operating arm 39 is adjusted and controlled. This is accomplished by means of the aforementioned cam 41, which cam is engaged with and movable by such iris stop indicating ring (not shown). Thus the desired iris diaphragm stop or restriction of closure is automatically obtained.

Figure 1:
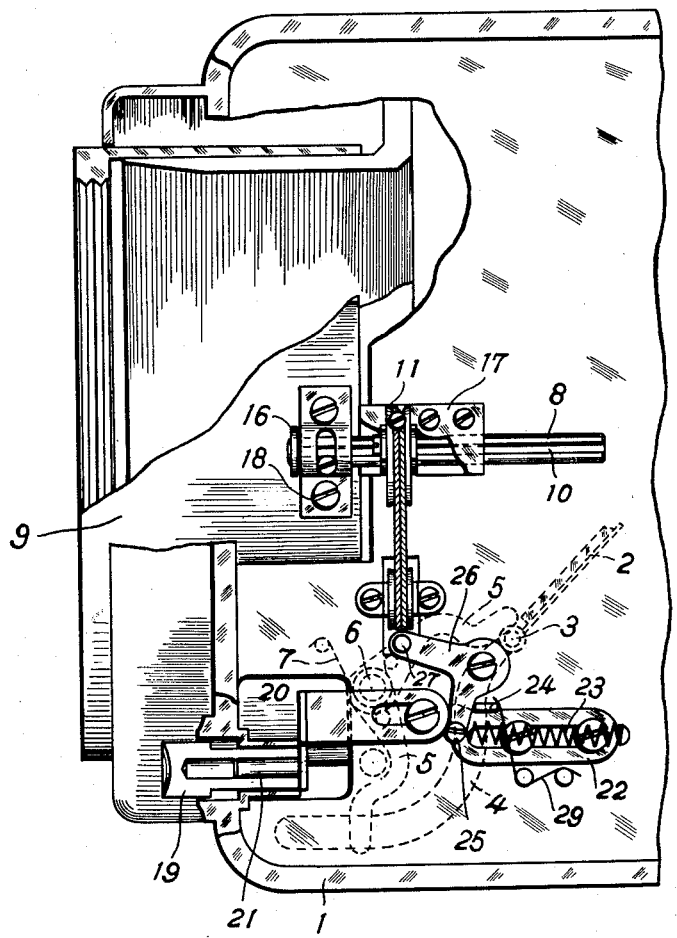
Fig. 1 is a side view, partly in section and with parts broken away, showing one form of the invention.

Thereafter the iris diaphragm operating button 19 is pushed thereby actuating the operative interconnection between it and the aforementioned lever arm 43. Thus the following occurs:

The sliding bracket 20 slides to the right (Fig. 1) causing movement of the lever arm 26 which follows the receding motion of the projection 24 (mounted on the connecting bracket 22) which in turn causes angular motion of the sector 11 via the strand of wire 28. The spring 23, which interconnects the righthand extremity of bracket 22 and the pin 25, causes the yielding following movement of such lever arm 26 in following the motion of the bracket 24 to the right (Fig. 1). The sector 11 (Fig. 2) thus is pulled down and caused to shift angularly clockwise moving the lever 16 in the same direction which thus engages the lever arm 43 in the manner shown in Fig. 2 and angularly shifts the lever arm 43. This actuates the iris diaphragm 34 by shifting angularly the iris operating lever arm 39 and the iris operating ring 31 via pin 38 until pin 40 engages the cam 41. Thus the iris diaphragms 34 are moved and are ready to be sent in motion at the time of photographing. There is thus obtained easily and automatically: (1) the stop or restricted opening of the iris diaphragm which conforms to the graduation to which the iris indicating ring was previously set; (2) the depth of focus with respect to the object to be photographed then is inspected via the viewing system of the camera (Fig. 6) and is adjusted, this being desired because the depth of focus may require it due to the temporary stopping of the iris diaphragm, which temporary stopping or restriction was not available theretofore when viewing through such viewing system; (3) then the suitable graduation of the stop is determined and the iris stop indicating ring is set by hand thereby changing the preset reduced diaphragm opening at which the diaphragm is maintained by pressing button 19; and (4) thereafter the iris operating button 19 is released under the influence of the resilient springs 29 (Fig. 1) and 46 (Fig. 3) thereby causing the iris diaphragms to return to their fully open state (operative state) and making the lens light.

In the next step, the shutter button 47 is pressed thereby causing the reflecting mirror to move out of the way by the movement of the supporting rod 3 which mounts such mirror 2 whereby the latter is lowered along the grooved rails 4. At this instant the lever arm 5 engages the rod 3 and is pulled down under the influence of spring 7 thereby pulling the wire 13 over the roller 14. This shifts angularly the sector 11 causing it to shift around the bearing 17 and operates the aforementioned lever 16 and hence the lever arm 43 (Fig. 2). The angular motion of the lever arm 43 actuates the iris operating ring 31 in the manner above described by angularly shifting the iris operating lever arm 39. This automatically angularly shifts the iris operating ring 31 via the pin 38 until the pin 40 of the lever arm 39 contacts with the cam 41. The iris diaphragm elements 34 are thus adjusted for photographing and are set in motion via the pins 32. Thus easily and automatically the best picture is taken with the desired stop (restricted open) set upon the diaphragm.

Thereafter under the action of spring 46, the lever 16 and sector 11 automatically are restored to their former position and at the same time the diaphragms 34 are restored to their fully open condition. Also, the lever arm 5 is pushed by the supporting rod 3 into its former position.

By means of the present invention, the inspection to determine whether the desired stop is suitable or not is made merely by holding the camera without any troublesome operation and merely by pressing the iris operating button 19. Further, the mechanism of the iris is of simple construction and inexpensive manufacture and by which the iris opening is easily adjusted as a result of the aforementioned inspection which is made during the pressing of the iris button 19 and before the pressing of the shutter button 47.

Having thus described the invention, what is claimed as new and desired to be secured by Letters Patent is:

1. Diaphragm control mechanism for a camera equipped with a normally closed shutter, said control mechanism, comprising in combination a shutter; an iris diaphragm closable to various selected degrees of openings by angular movement of an operating ring; a spring constantly urging said operating ring in an angular direction tending to open said diaphragm; an angularly adjustable came ring; an iris operating lever arm for moving said iris operating ring in an angular direction opposed to the urging of said spring through an angle determined by the angular position of said cam ring; an iris diaphragm control member operatively connected with said lever arm whereby application of force to said control member actuates said lever arm to move said iris operating ring and thereby close said iris diaphragm to an extent depending upon the angular position of said cam ring while said shutter remains in its normally closed position, said spring causing said diaphragm to return to the opened position upon release of said force; and shutter actuating mechanism operatively connected to said iris operating lever arm whereby activation of said shutter actuating mechanism causes said lever arm to move said operating ring and close said diaphragm to an extent dependent upon the angular setting of said cam ring prior to the opening of said shutter also in response to the operation of said shutter actuating mechanism, said spring returning said diaphragm to the opened position following operation of said shutter actuating mechanism.

2. Diaphragm control mechanism for a camera comprising in combination a shutter; an iris diaphragm closable to various selected degrees of opening by angular movement of an operating ring; spring means constantly urging said operating ring in an angular direction tending to open said diaphragm and normally retaining said diaphragm in open position; an angularly adjustable cam; a diaphragm control member operatively connected with said operating ring whereby application of force to said control member actuates said operating ring to close said diaphragm to an extent dependent upon the angular position of said cam while said shutter remains unaffected, said spring means causing said diaphragm to return to the opened position upon release of said force; and shutter actuating mechanism operatively connected to said operating ring whereby activation of said shutter actuating mechanism causes said operating ring to close said diaphragm to an extent dependent upon the angular setting of said cam prior to the opening of said shutter also in response to the operation of said shutter actuating mechanism, said spring means returning said diaphragm to the opened position following operation of said shutter actuating mechanism.

3. Diaphragm control mechanism for a camera comprising in combination a shutter; an iris diaphragm closable to various selected degrees of openings by angular movement of an operating ring; spring means constantly urging said operating ring in an angular direction tending to open said diaphragm; an angularly adjustable cam ring; a diaphragm control member operatively connected with said operating ring whereby application of force to said control member actuates said operating ring against the urging of said spring means to close said diaphragm to an extent dependent upon the angular position of the said cam ring during application of such force; said shutter being free of control by said diaphragm control member; and shutter actuating mechanism operatively connected to said operating ring whereby activation of said shutter actuating mechanism causes said operating ring to close said diaphragm to an extent dependent upon the angular setting of said cam ring prior to the opening of said shutter also in response to the operation of said shutter actuating mechanism.

4. Diaphragm control mechanism for a camera having a mirror reflex type of viewing system and comprising in combination a shutter; an iris diaphragm adjustable to a preset reduced opening by angular movement of an iris operating ring; spring means constantly urging said iris operating ring in an angular direction tending to open said diaphragm; an angularly adjustable cam ring for selecting said preset reduced opening; an iris diaphragm control member operatively connected with said iris operating ring whereby application of force to said control member actuates said iris operating ring against the urging of said spring means to close said diaphragm to said preset reduced opening during application of such force; said shutter being free of control by said diaphragm control member; means for adjusting the depth of focus with respect to the object to be photographed, such means being actuatable by the operator in response to inspection of such object and other objects either closer or farther away via such viewing system; means for adjusting said cam ring during application of such force thereby changing said preset reduced iris diaphragm opening at which the iris diaphragm is maintained temporarily by such force; and shutter actuating mechanism operatively connected to said iris operating ring whereby activation of said shutter actuating mechanism causes said operating ring to close said diaphragm to said adjusted and changed preset reduced opening prior to the opening of said shutter also in response to the operation of said shutter actuating mechanism.

5. A camera of the monocular mirror-reflex type including in combination therewith: normally closed shutter means, a shutter button operatively associated therewith; an iris operating button in a substantially symmetrical position with respect to an objective lens on the camera whereby a person operating the camera can view the object to be photographed through the mirror-reflex camera system of the monocular camera, said shutter button being operable by a finger of one hand, the iris operating button being operable by a finger of the other hand, both hands concurrently supporting the camera while viewing through such mirror-reflex system; an iris diaphragm including a plurality of diaphragm elements; an iris diaphragm control mechanism including spring means for urging said diaphragm normally to a full open position, means for operatively interconnecting said iris diaphragm and said iris operating button whereby in response to the pressing of said button the iris diaphragm is closed to a preselected lesser opening and by releasing said iris operating button said diaphragm is automatically restored to fully opened condition, said iris diaphragm control mechanism comprising in combination: an iris operating ring mounted for angular movement about the axis of said iris, means for supporting said iris operating ring for such angular movement, the angular movement of the iris operating ring opening or closing the iris diaphragm depending upon the direction of angular movement about said axis, the elements of said iris diaphragm being mounted for pivotal movement each about its respective axis and in response to the aforementioned angular movement of said iris operating ring, means for operatively interconnecting said angularly adjustable cam ring and said iris operating ring and including an iris operating lever arm mounted for pivotal movement about a fixed axis through an angular increment which is a function of the setting of said cam ring, said spring means aforementioned normally maintaining out of contact said iris operating lever arm and said cam ring, the latter lever arm being capable of moving said iris operating ring in an angular direction opposed to said spring through an angle determined by the setting of said cam ring, means for operatively interconnecting said iris lever arm and said iris operating button whereby the pressing of said button actuates said iris operating lever arm to move said iris operating ring against the force of said spring thereby to close said iris diaphragm to a lesser opening the extent of which is responsive to the angular position of said cam ring and while said shutter remains in its normally closed position, means for adjusting the depth of focus with respect to the object being photographed and while inspecting same and other objects either closer or farther away via such monocular reflex type viewing system during such lesser opening of the iris diaphragm; means for adjusting said cam ring to a determined stop while said button is pressed, thereby changing the present reduced diaphragm opening at which the iris diaphragm is temporarily maintained by pressing said button, said spring means causing said diaphragm to return to its full open position upon release of said iris operating button, said means for operatively interconnecting the iris operating button and said iris operating lever arm embracing means for angularly shifting said iris operating lever arm; means for operatively interconnecting said shutter button and said normally closed shutter means, and means for operatively connecting said shutter button and said iris operating lever for angularly shifting the latter lever arm to move said iris operating ring to the limit of its angular movement as determined by the setting of the cam ring and prior to the actuation of said shutter means, said spring means returning said iris operating ring and iris diaphragm to full open position following operation of said shutter button.

6. A camera of the monocular mirror-reflex type including in combination therewith normally a closed shutter; a shutter operating button; an iris diaphragm including a plurality of diaphragm elements, and means for normally holding said diaphragm elements in a full open position; said buttons being mounted on said camera in positions symmetrical with respect to an objective on the camera body; said camera including a mirror reflex viewing system, said system embracing a reflecting mirror, means for moving said reflecting mirror from an operating position to an inactive position in response to the pressing of such shutter button, said iris diaphragm being concurrently closed to a lesser preselected opening in response to the pressing of such shutter button by means of a diaphragm control mechanism, the latter mechanism comprising in combination an iris operating ring mounted for angular movement, means for mounting said iris operating ring for such angular movement, spring means for constantly urging said iris operating ring in an angular direction tending to open said diaphragm, means for controlling the extent to which the opening of said diaphragm can be restricted and including an angularly adjustable cam ring, means for operatively associating said iris operating ring and said cam ring comprising an iris operating lever arm mounted for angular movement and in response to angular movement of such lever arm engaging and angularly shifting said iris operating ring to an extent determined by the angular setting of said cam ring and against the force of said spring; means for operatively interconnecting said shutter button and said iris operating lever arm thereby to shift the latter angularly to close the iris diaphragm a preselected amount prior to the actuation of said shutter means; resilient means for restoring said reflecting mirror to its operating position in response to the release of said shutter button, said spring means reopening said diaphragm to its full open position automatically following release of said shutter button; and independent means for operatively interconnecting said iris operating button and said iris operating lever and including resilient means interposed therein, said iris diaphragm thus being closable from its full open position to a position of preselected lesser opening determined by the setting of the cam and in response to the pressing of said iris operating button, said spring means restoring said iris diaphragm to full open condition in response to release of said iris operating button.

(References on following page)

References Cited in the file of this patent

UNITED STATES PATENTS

| | | |
|---|---|---|
| 2,262,509 | McNabb | Nov. 11, 1941 |
| 2,435,752 | Pearce | Feb. 10, 1948 |
| 2,504,011 | Dunlap | Apr. 11, 1950 |
| 2,803,182 | Werner | Aug. 20, 1957 |
| 2,805,610 | Haupt | Sept. 10, 1957 |

FOREIGN PATENTS

| | | |
|---|---|---|
| 409,777 | Great Britain | May 10, 1934 |
| 1,003,952 | France | Nov. 21, 1951 |